United States Patent
Kumar et al.

(10) Patent No.: US 12,517,923 B2
(45) Date of Patent: Jan. 6, 2026

(54) DATABASE REPLICATION FOR REAL-TIME DATA EXTRACTION

(71) Applicant: Express Scripts Strategic Development, Inc., St. Louis, MO (US)

(72) Inventors: Ghanshyam Kumar, Orlando, FL (US); Murlidhar Loka, Breinigsville, PA (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/444,336

(22) Filed: Feb. 16, 2024

(65) Prior Publication Data

US 2025/0265267 A1    Aug. 21, 2025

(51) Int. Cl.
*G06F 16/27* (2019.01)
*G06F 16/22* (2019.01)
*G06F 16/25* (2019.01)
*G06F 16/28* (2019.01)

(52) U.S. Cl.
CPC .......... *G06F 16/27* (2019.01); *G06F 16/2219* (2019.01); *G06F 16/258* (2019.01); *G06F 16/284* (2019.01)

(58) Field of Classification Search
CPC .... G06F 16/27; G06F 16/2219; G06F 16/258; G06F 16/284
See application file for complete search history.

(56) References Cited

U.S. PATENT DOCUMENTS

| | | | |
|---|---|---|---|
| 6,032,158 A | 2/2000 | Mukhopadhyay | |
| 6,738,789 B2 | 5/2004 | Multer | |
| 6,999,956 B2 | 2/2006 | Mullins | |
| 7,313,575 B2 | 12/2007 | Carr | |
| 7,487,173 B2 | 2/2009 | Medicke | |
| 7,856,420 B2 | 12/2010 | Zargham | |
| 10,866,938 B2 | 12/2020 | Gupta | |
| 2002/0040369 A1 | 4/2002 | Multer | |
| 2005/0138048 A1 | 6/2005 | Jin | |
| 2005/0198074 A1 | 9/2005 | Khayter | |
| 2005/0229022 A1 | 10/2005 | Koishi | |

(Continued)

OTHER PUBLICATIONS

Qlik Replicate Setup and User Guide Qlik ReplicateTM May 2023 (Year: 2023).*

*Primary Examiner* — Khanh B Pham
*Assistant Examiner* — Samuel C Sharpless, III
(74) *Attorney, Agent, or Firm* — Harness IP

(57) ABSTRACT

An example computer system includes a transactional database configured to store multiple data sources each corresponding to one of multiple applications, a standby database configured to store multiple rule schemas and multiple data schemas, and processor hardware configured to execute instructions to monitor for a change to stored data in one of the multiple data sources, via a change data capture process, replicate data from the transactional database to the standby database in response to an update indicated by the change data capture process, identify encrypted data in at least one data object of an updated data table of one of the data schemas of the standby database, extract data from the at least one data object to store decrypted data, wherein the standby database is an external database for the data extraction engine, and reload the decrypted data to one of the data schemas of the standby database.

20 Claims, 11 Drawing Sheets

(56) References Cited

U.S. PATENT DOCUMENTS

| | | |
|---|---|---|
| 2005/0262170 A1 | 11/2005 | Girkar |
| 2007/0055647 A1 | 3/2007 | Mullins |
| 2012/0054149 A1* | 3/2012 | Khanna ............ G06F 16/24565 |
| | | 707/E17.005 |
| 2018/0012300 A1 | 1/2018 | Imrey |
| 2018/0150540 A1* | 5/2018 | Florendo ............... G06F 16/273 |
| 2018/0268017 A1 | 9/2018 | Parikh |
| 2020/0293512 A1 | 9/2020 | Parikh |
| 2023/0067054 A1* | 3/2023 | Kulkarni ............... H04L 9/0894 |

\* cited by examiner

DATABASE REPLICATION FOR REAL-TIME DATA EXTRACTION

FIELD

The present disclosure relates to database replication for real-time data extraction.

BACKGROUND

Running complex queries on a transactional database may be a time consuming process. The queries may have a performance impact on a live application of the transactional database.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An example computer system includes a transactional database configured to store multiple data sources each corresponding to one of multiple applications associated with the transactional database, a standby database configured to store multiple rule schemas and multiple data schemas, each of the multiple rule schemas and the multiple data schemas corresponding to one of the multiple data sources stored in the transactional database, and processor hardware configured to execute instructions to monitor for a change to stored data in one of the multiple data sources, via a change data capture process, replicate data from the transactional database to the standby database in response to an update indicated by the change data capture process, identify encrypted data in at least one data object of an updated data table of one of the data schemas of the standby database, extract, by a data extraction engine, data from the at least one data object to store decrypted data, wherein the standby database is an external database for the data extraction engine, and reload the decrypted data to one of the data schemas of the standby database.

In other examples, the at least one data object of the updated data table of one of the data schemas of the standby database is a binary large object (BLOB).

In other examples, the data sources include a first data source corresponding to a first one of the multiple applications and a second data source corresponding to a second one of the multiple applications, the multiple rule schemas include a first rule schema corresponding to the first data source associated with the first one of the multiple applications and a second rule schema corresponding to the second data source associated with the second one of the multiple applications, and the multiple data schemas include a first data schema corresponding to the first data source associated with the first one of the multiple applications and a second data schema corresponding to the second data source associated with the second one of the multiple applications.

In other examples, the processor hardware is configured to execute instructions to extract data from the at least one data object, and reload the decrypted data to one of the data schemas of the standby database, in real time in response to the update indicated by the change data capture process.

In other examples, the processor hardware is configured to execute instructions reload the decrypted data to a same one of the data schemas of the standby database which stores the at least one data object.

In other examples, the transactional database includes a relational database management system (RDBMS).

In other examples, each of the multiple data schemas of the standby database includes one or more tables, and the standby database includes at least one identifier configured to facilitate a read of a record from the one or more tables, a write of the record to the one or more tables, an update of the record from the one or more tables, and a deletion of the record from the one or more tables.

In other examples, the one or more tables include at least one of a customer name record, a customer date of birth record, a customer age record, and a customer email record.

In other examples, the processor hardware is configured to execute instructions to select one of the one or more tables, identify a maximum size of a row of the selected one of the one or more tables, determine a size of an expanded row of the selected one of the one or more tables, after extracting data from a record of the selected one of the one or more tables, identify a maximum daily volume of the selected one of the one or more tables, determine a specified number of years for storing data of the selected one of the one or more tables, and calculate a storage size based on the size of the expanded row, the maximum daily volume and the specified number of years.

In other examples, the multiple applications are Pega applications, replicating data includes executing a Qlik tool replication process, and the data extraction engine includes a Pega BIX extraction module.

An example method of database replication for real-time data extraction includes monitoring for a change to stored data in one of multiple data sources stored in a transactional database, via a change data capture process, the multiple data sources each corresponding to one of multiple applications associated with the transactional database, replicating data from the transactional database to a standby database in response to an update indicated by the change data capture process, wherein the standby database is configured to store multiple rule schemas and multiple data schemas, each of the multiple rule schemas and the multiple data schemas corresponding to one of the multiple data sources stored in the transactional database, identifying encrypted data in at least one data object of an updated data table of one of the data schemas of the standby database, extracting, by a data extraction engine, data from the at least one data object to store decrypted data, wherein the standby database is an external database for the data extraction engine, and reloading the decrypted data to one of the data schemas of the standby database.

In other examples, the at least one data object of the updated data table of one of the data schemas of the standby database is a binary large object (BLOB).

In other examples, the data sources include a first data source corresponding to a first one of the multiple applications and a second data source corresponding to a second one of the multiple applications, the multiple rule schemas include a first rule schema corresponding to the first data source associated with the first one of the multiple applications and a second rule schema corresponding to the second data source associated with the second one of the multiple applications, and the multiple data schemas include a first data schema corresponding to the first data source associated with the first one of the multiple applications and a second data schema corresponding to the second data source associated with the second one of the multiple applications.

In other examples, the extracting and reloading includes extracting data from the at least one data object, and reloading the decrypted data to one of the data schemas of the standby database, in real time in response to the update indicated by the change data capture process.

In other examples, reloading includes reloading the decrypted data to a same one of the data schemas of the standby database which stores the at least one data object.

In other examples, the transactional database includes a relational database management system (RDBMS).

In other examples, each of the multiple data schemas of the standby database includes one or more tables, and the standby database includes at least one identifier configured to facilitate a read of a record from the one or more tables, a write of the record to the one or more tables, an update of the record from the one or more tables, and a deletion of the record from the one or more tables.

In other examples, the one or more tables include at least one of a customer name record, a customer date of birth record, a customer age record, and a customer email record.

In other examples, the method includes selecting one of the one or more tables, identifying a maximum size of a row of the selected one of the one or more tables, determining a size of an expanded row of the selected one of the one or more tables, after extracting data from a record of the selected one of the one or more tables, identifying a maximum daily volume of the selected one of the one or more tables, determining a specified number of years for storing data of the selected one of the one or more tables, and calculating a storage size based on the size of the expanded row, the maximum daily volume and the specified number of years.

In other examples, the multiple applications are Pega applications, replicating data includes executing a Qlik tool replication process, and the data extraction engine includes a Pega BIX extraction module.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
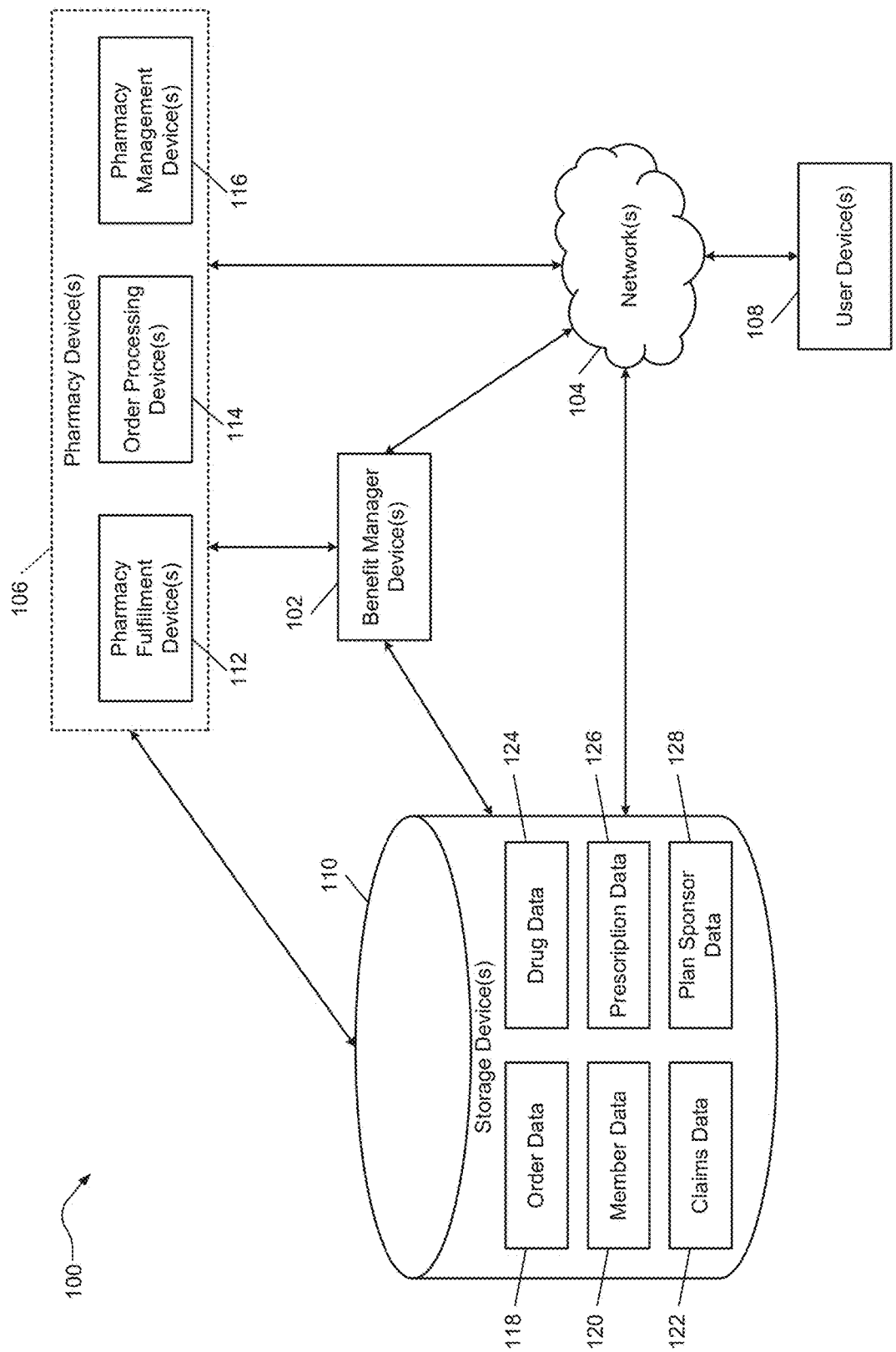
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device.

Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug is successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally, or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
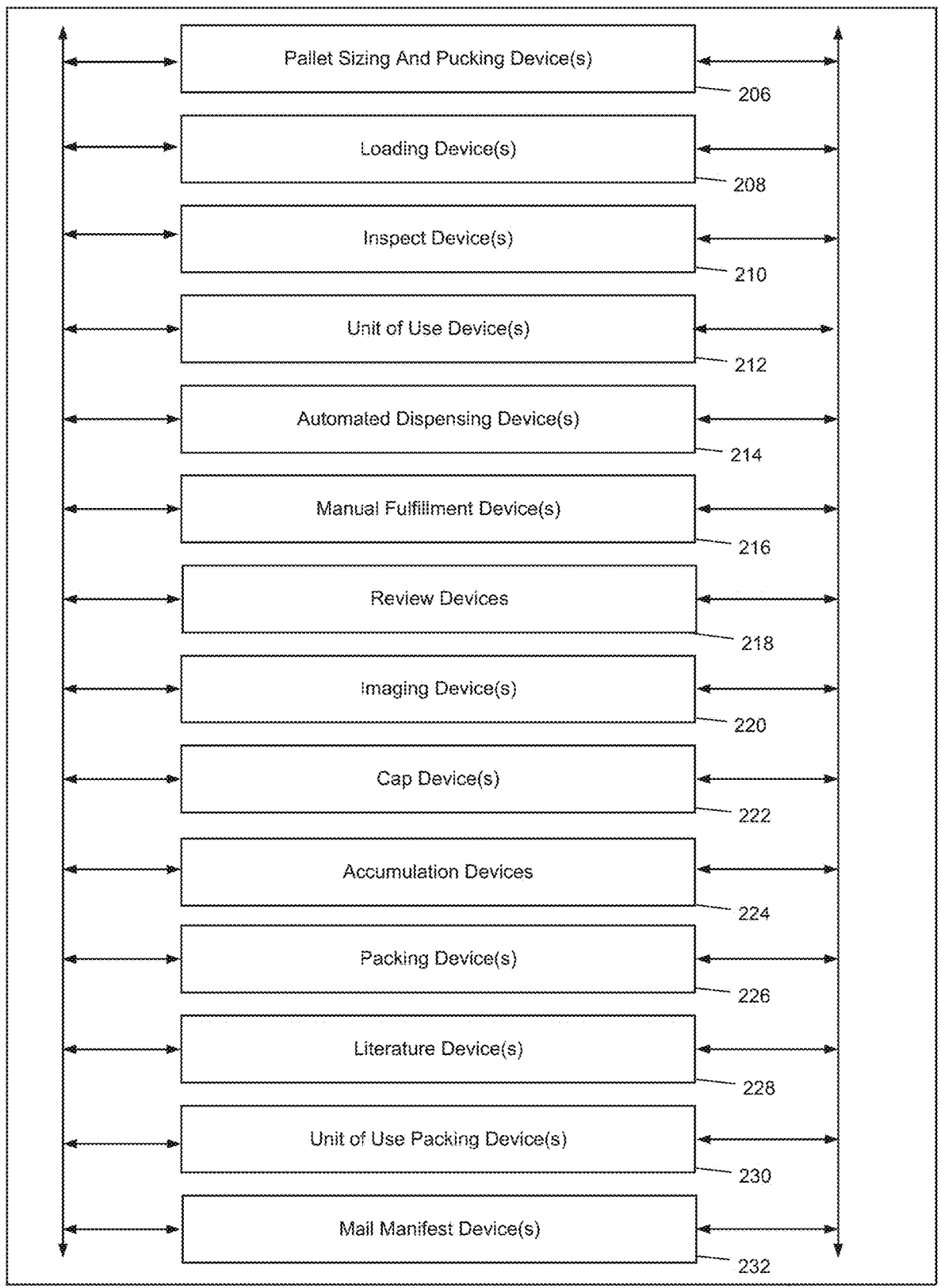
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
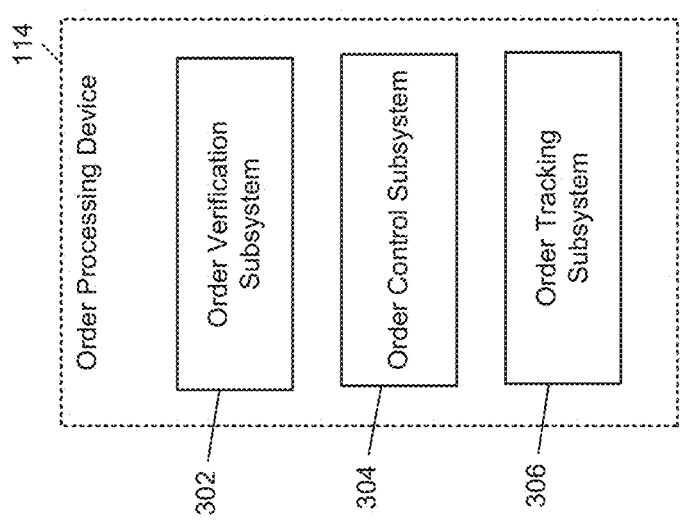
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Database Replication System for Real-Time Data Extraction

Extracting data in real time from a database application (e.g., a Pega application), may be a challenging and slow process due to involvement of a complex query and execution process. In some example embodiments described herein, data synchronization may be used to develop a read replica, which is used to execute an extraction process.

For example, a reporting database may be set up, and data replication may be set up from a transactional database to a reporting database. An extraction engine may be developed to extract data from the reporting database, and load it back to the reporting database, for further reporting and analytics work. This may be executed as an automated process which will work with any suitable database application (e.g., Pega application), within an organization or outside of an organization. The implementation may also be extended to support other types of data extraction as well.

Running complex queries on a transactional database may be a time consuming process, and may cause a performance impact on a live application. In order to reduce or avoid the performance impact, data replication may be used, including a read replica or reporting database.

For example, a process may include setting up a reporting database (e.g., standby database), and using data replication (e.g., change data capture) to replicate data from an application database to a standby database. A data extraction engine (e.g., using Pega BIX) may be used to keep running in close to real time, to extract encrypted data out of a BLOB.

The extraction engine may use a standby database as the external database to run the extraction process. Data from multiple applications may be hosted under different and unique schema dedicated for each corresponding application. The extracted and decrypted data may be reloaded to the same standby database. Other processes may use the close to real time extracted data for analytics and reporting.

The data extraction engine may be an enterprise wide application, configured to support any application (e.g., any Pega application). Applications interested in using the data extraction engine of the extraction layer 906 may be onboarded by taking property, classes and rule sets from the application, and migrating them to the extraction engine. Extraction rules may be developed in the extraction engine, and necessary classes may be connected to the standby database tables including the BLOB (or other suitable data objects having data which needs extraction). A BIX extract execution may be set up close to real-time, and access restriction may be implemented.

Figure 4:
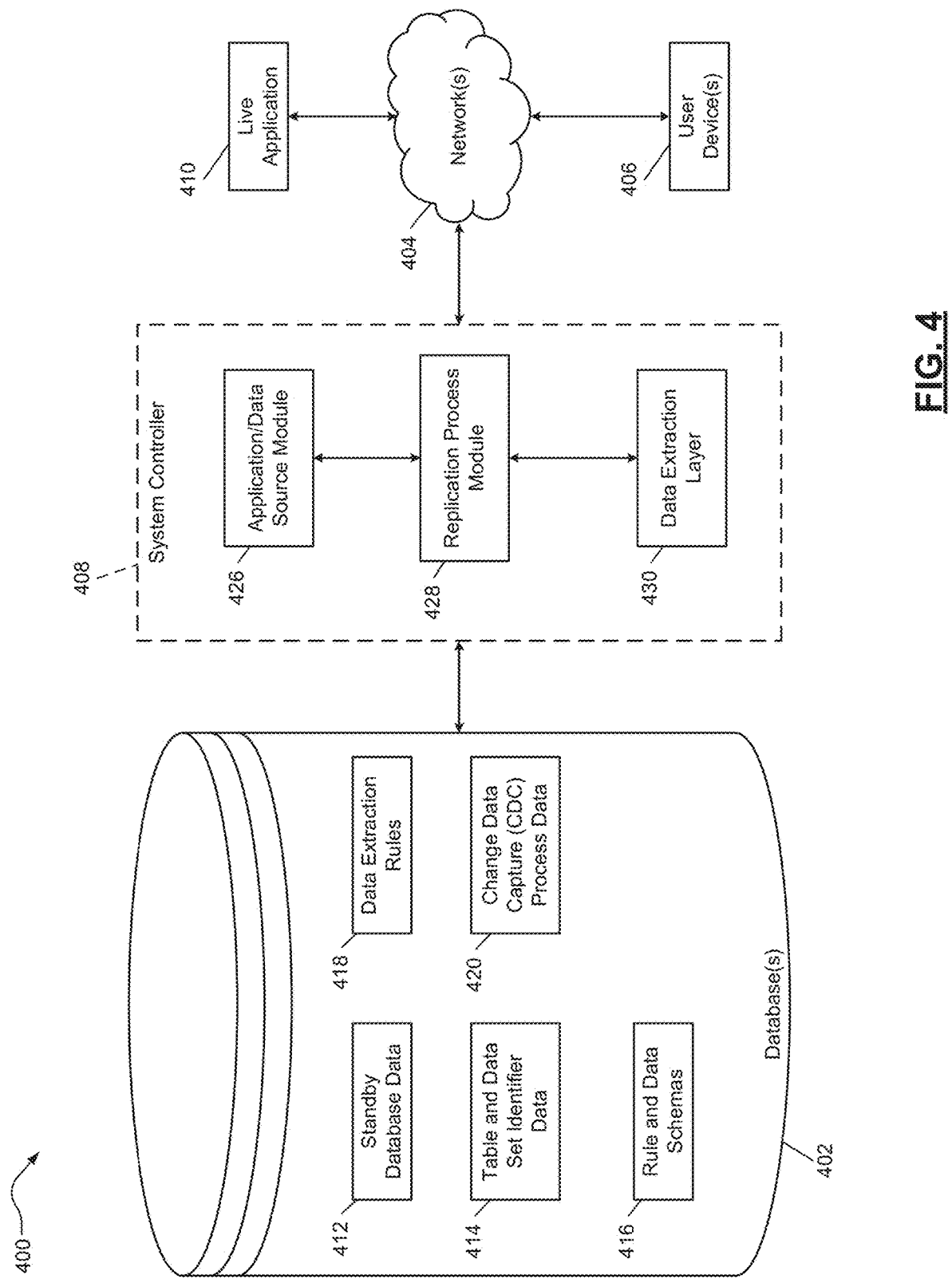
FIG. 4 is a functional block diagram of an example system for database replication for real-time data extraction.

FIG. 4 is a functional block diagram of an example system 400 for database replication for real-time data extraction, which includes one or more databases 402. While the system 400 is generally described as being deployed in a computer network system, the database 402 and/or components of the system 400 may otherwise be deployed (for example, as a standalone computer setup). The system 400 may include a desktop computer, a laptop computer, a tablet, a smartphone, etc.

As shown in FIG. 4, the database 402 stores standby database data 412, table and data set identifier data 414, rule and data schemas 416, data extraction rules 418, and change data capture (CDC) process data 420. In various implementations, the database 402 may store other types of data as well, or may not store all of the example data types illustrated in FIG. 4.

The standby database data 412, table and data set identifier data 414, rule and data schemas 416, data extraction rules 418, and change data capture (CDC) process data 420 may be located in different physical memories within the database 402, such as different random access memory (RAM), read-only memory (ROM), a non-volatile hard disk or flash memory, etc., or be spread across multiple different databases. In some implementations, the standby database data 412, table and data set identifier data 414, rule and data schemas 416, data extraction rules 418, and change data capture (CDC) process data 420 may be located in the same memory (such as in different address ranges of the same memory). In various implementations, the standby database data 412, table and data set identifier data 414, rule and data schemas 416, data extraction rules 418, and change data capture (CDC) process data 420 may each be stored as structured or unstructured data in any suitable type of data store.

As shown in FIG. 4, a system controller 408 may include one or more modules, including an application/data source module 426, a replication process module 428, and a data extraction layer 430. These example modules are provided for purposes of illustration, and other embodiments may include more or less modules, functions of different software features implemented in other modules or controller locations, more than one system controller, more than one database, data distributed to other databases, etc.

In various implementations, a system developer may access the system controller 408 via the user device 406. The user device 406 may include any suitable user device for displaying text and receiving input from a user, including a desktop computer, a laptop computer, a tablet, a smartphone, etc. In various implementations, the user device 406 may access the database 402 or the system controller 408 directly, or may access the database 402 or the system controller 408 through one or more networks 404. Example networks may include a wireless network, a local area network (LAN), the Internet, a cellular network, etc. The system controller 408 may interact with a live application 410, directly or through the one or more networks 404.

Figure 5:
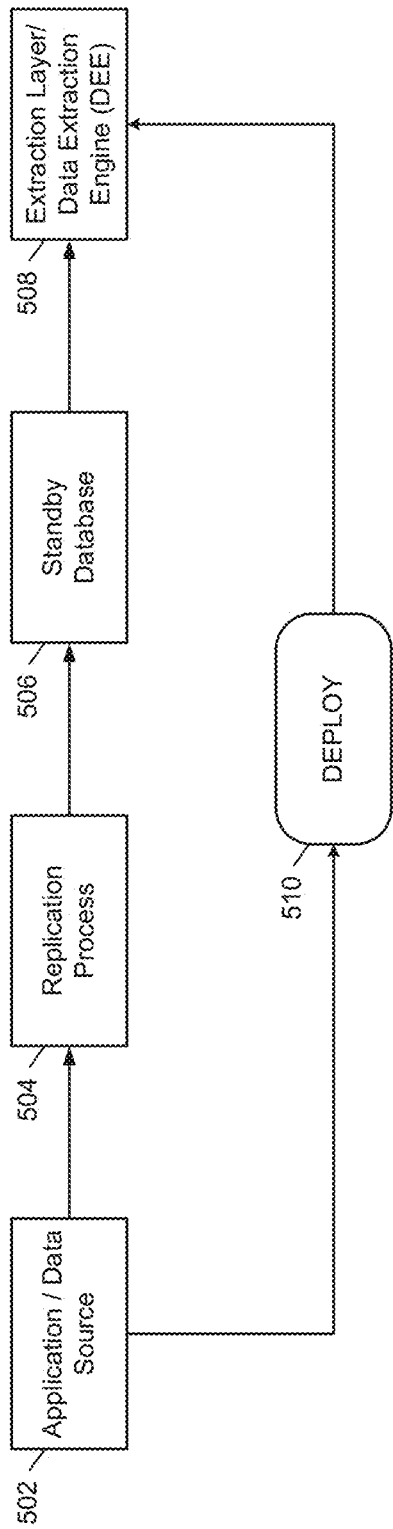
FIG. 5 is a functional block diagram illustrating example components of the system of FIG. 4.

FIG. 5 is a functional block diagram illustrating example components of the system of FIG. 4. As shown in FIG. 5, the example system may include an application/data source 502, a replication process 504, a standby database 506, and an extraction layer/data extraction engine (DEE) 508. A deploy process 510 may be implemented between the application/data source 502 and the extraction layer/data extraction engine 508.

The example system of FIG. 5 may be configured to utilize a data synchronization concept to develop a read replica, and use it to execute the extraction process. For example, the system may be configured to setup a reporting database, setup data replication from a transactional database to a reporting database, and develop an extraction engine (such as the data extraction engine 508) to extract data from the reporting database and load it to the reporting database for further reporting and analytics work.

In some example embodiments, the system of FIG. 5 may execute an automated process which works with any suitable application (e.g., a Pega application) within an organization or outside of an organization. The process may be extended to support other types of data extraction as well.

Running complex queries on a transactional database may be a time consuming process, and may cause a performance impact on the live application (such as the application/data source 502). The example system of FIG. 5 may use data replication (such as via the replication process 504), to avoid impacts to the live application. For example, the system of FIG. 5 may be separated into four layers, as described above: an application/data source 502, a replication process 504, a standby database 506, and an extraction layer/data extraction engine (DEE) 508. Further details of these example layers are described further below with reference to FIGS. 6-8.

Figure 6:
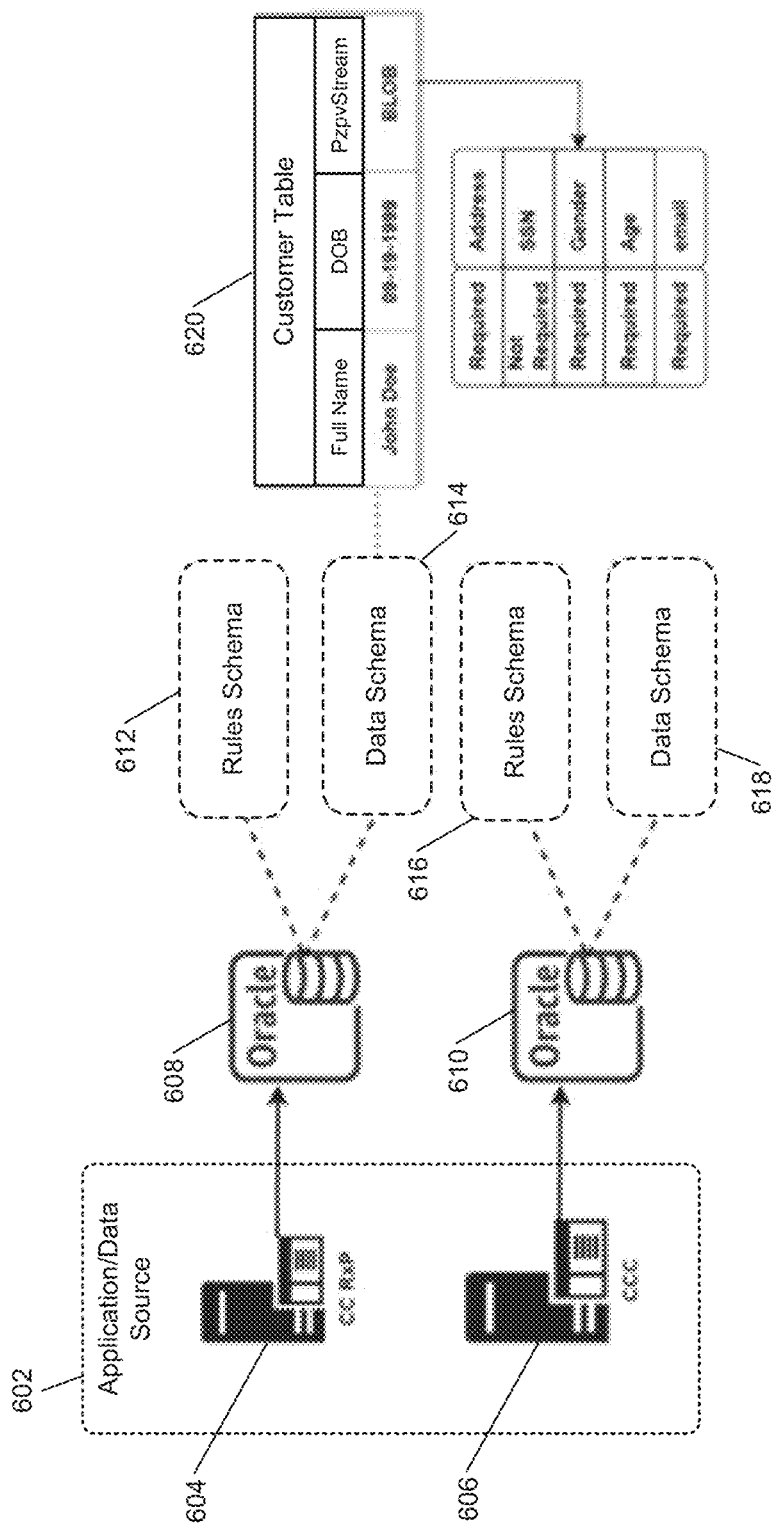
FIG. 6 is a functional block diagram of an example application and data source of the system of FIG. 4.

FIG. 6 is a functional block diagram of an example application and data source 602 of the system of FIG. 4. As shown in FIG. 6, a first application 604 (which may be developed in Pega, for example), is integrated with a first database 608 (e.g., an Oracle RDBMS database). A second application 606 (which may be developed in Pega, for example), is integrated with a second database 610 (e.g., an Oracle RDBMS database).

The data source 602 may be a primary data repository integrated with a live application. The data source 602 may provide an open connection for a database, to that other layers may connect the database and read the data. For example, the data source 602 may include any suitable database, such as a relational database management system (RDBMS).

Required tables and data sets may be identified for extraction. For example, based on the need, either a complete table may be loaded, or specific columns of any table can be included. For a binary large object (BLOB) (e.g., with an encrypted column), a set of data elements may be prepared for reporting, or a completed blog may be loaded to a standby database.

Referring again to FIG. 6, application tables may be created in a data schema (e.g., a Pega data schema), such as the data schema 614 for the first database 608 and the data schema 618 for the second database 610. Although there may be multiple stored application tables in each data schema, FIG. 6 illustrate an example Customer Table 620. Each database may also have a rules schema, such as a rules schema 612 for the first database 608 and a rules schema 616 for the second database 610.

The Customer Table 620 includes multiple columns, which may be identified for extraction. The example columns illustrated in the Customer Table 620 include a full name, a date of birth (DOB), and a pzpvStream. Other columns from a BLOB, which may be encrypted, may also be identified. In the example of FIG. 6, the BLOB includes an address, a social security number (SSN), a gender, an age, and an email. In various implementations, the application database may include a user identifier (ID), which may be used to access all tables and read the data.

Figure 7:
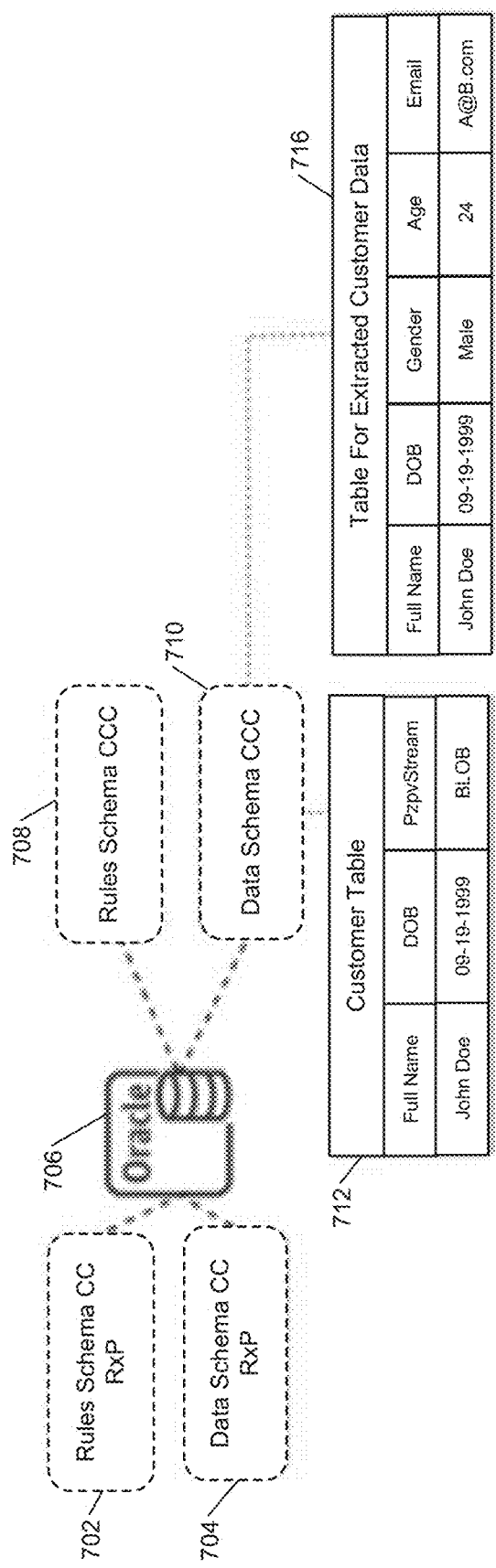
FIG. 7 is a functional block diagram of an example standby database of the system of FIG. 4.

FIG. 7 is a functional block diagram of an example standby database of the system of FIG. 4. As shown in FIG. 7, a standby database 702 (e.g., an Oracle database), may include multiple rules schemas and data schemas, which may each correspond to different applications, data sources, etc. In this example, a first rules schema 702 and a first data schema 704 correspond to a first application/data source, and a second rules schema 708 and a second data schema 710 correspond to a second application/data source.

The data schemas may include any suitable data, which may be stored in multiple tables, including tables for extracted data. In FIG. 7, the second data schema 710 includes a customer table 712 having columns for full name, date of birth and pzpvStream, and the table for extracted customer data 716 includes columns for a full name, date of birth, gender, age, and email. For example, some data in the extracted customer data 716 may include data extracted from BLOB of the customer table 712.

In various implementations, the standby database may be used to load data from an application database. The standby database may be, for example, any suitable RDBMS database. Setting up the standby database may include any suitable process, such as a standard process for setting up other databases.

The standby database may hold rules and data related tables for multiple applications in different schemas. Different schemas may be used to keep data separated in appropriate groups. The standby database may include one or more identifiers (IDs), which can read, write, update, delete, etc., any table or records from any table (e.g., for replication, for extraction, etc.).

The size of the standby database may be larger than a size of the application database, so the standby database can hold data from multiple applications as well as extracted data (which may be extracted out of a BLOB, etc.). In some examples, a size of a standby database may be specified by a process including identifying a maximum size of a row of a table (X kB). All BLOB data may be extracted for a record in the application database, to determine a size of an expanded row (Y KB). In this example, a maximum size needed for one record of one table may be (X+Y=Z kB).

Next, a maximum volume for a day (N) may be identified, so a total size needed for a day is (N×Z=A kB). A number of years of data to be stored may be defined as P, so that a total size needed to hold data for P years is (A×365=P kB).

In some examples, a replication process is used to read data from an application database and load the data to a standby database. The replication process may be executed in real-time, based on a change data capture (CDC) process.

For example, the replication process may use identifiers defined in the above layers (e.g., multiple applications/data sources, standby database), to connect to respective sources. A replication task may be created (e.g., in Qlik), to control load behavior. The Qlik process may be a standard process based on the Qlik tool.

Figure 8:
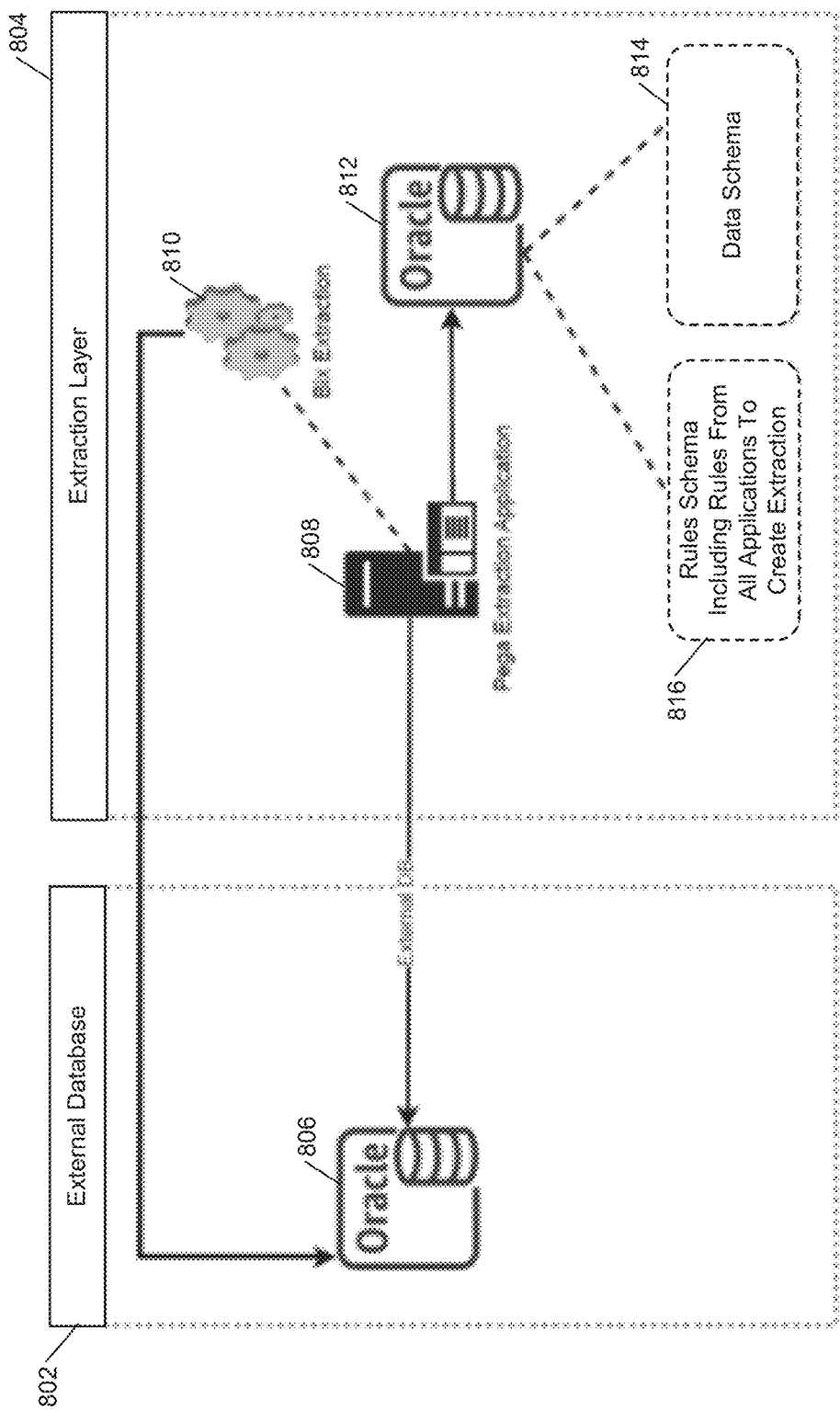
FIG. 8 is a functional block diagram of an example extraction layer of the system of FIG. 4.

FIG. 8 is a functional block diagram of an example extraction layer of the system of FIG. 4. As shown in FIG. 8, an extraction layer 804 is connected with an external database 802. The external database may include, for example, an Oracle database 806.

The extraction layer 804 may include an extraction application 808 (e.g., a Pega extraction application), which is coupled with the external database 802. The extraction layer 804 may include a BIX extraction 810, and an extraction layer database 812 (which may be an Oracle database). The extraction layer database 812 may include a data schema 814, and a rules schema 816 (which may include rules from all applications to create extraction).

In various implementations, the extraction layer (e.g., a data extraction engine (DEE)) may be another application which holds data extraction rules, and is responsible for reading data from a BLOB (or other suitable compressed or encrypted data source or component) and loading the extracted data to a dedicated table in a stand by database. The application setup may be a standard (e.g., Pega) application setup, which may include a backend database. There may be a Pega BIX framework installed to support the extract rule creation. Example code for the application to setup a connection to different schema of the standby database is provided below:

```
//
<Resource name="jdbc/PegaRULES"
auth="Container"
type="javax.sql.DataSource"
maxTotal="100"
maxIdle="30"
maxWaitMillis="10000"
driverClassName="*********"
url="jdbc:***********"
username="*************"
password="**********"/>
<Environment
name="preconfig/database/databases/PegaRULES/defaultSchema"
value="rules" type="jave.lang.String" />
<Environment
name="preconfig/database/databases/PegaDATA/defaultSchema"
value="data" type="java.lang.String" />
```

The extraction application may have an extract rule created for all source applications, and for different tables, to extract data from the BLOB (or other suitable compressed or encrypted data object). The application may have multiple batch jobs, queue processors, etc., to run the extraction rules with an optimized frequency. Batch job optimizations may be based on data volume incoming to the standby database. In some examples, a log may be included in the batch process to monitor the extracted record count and track the process execution.

Figure 9:
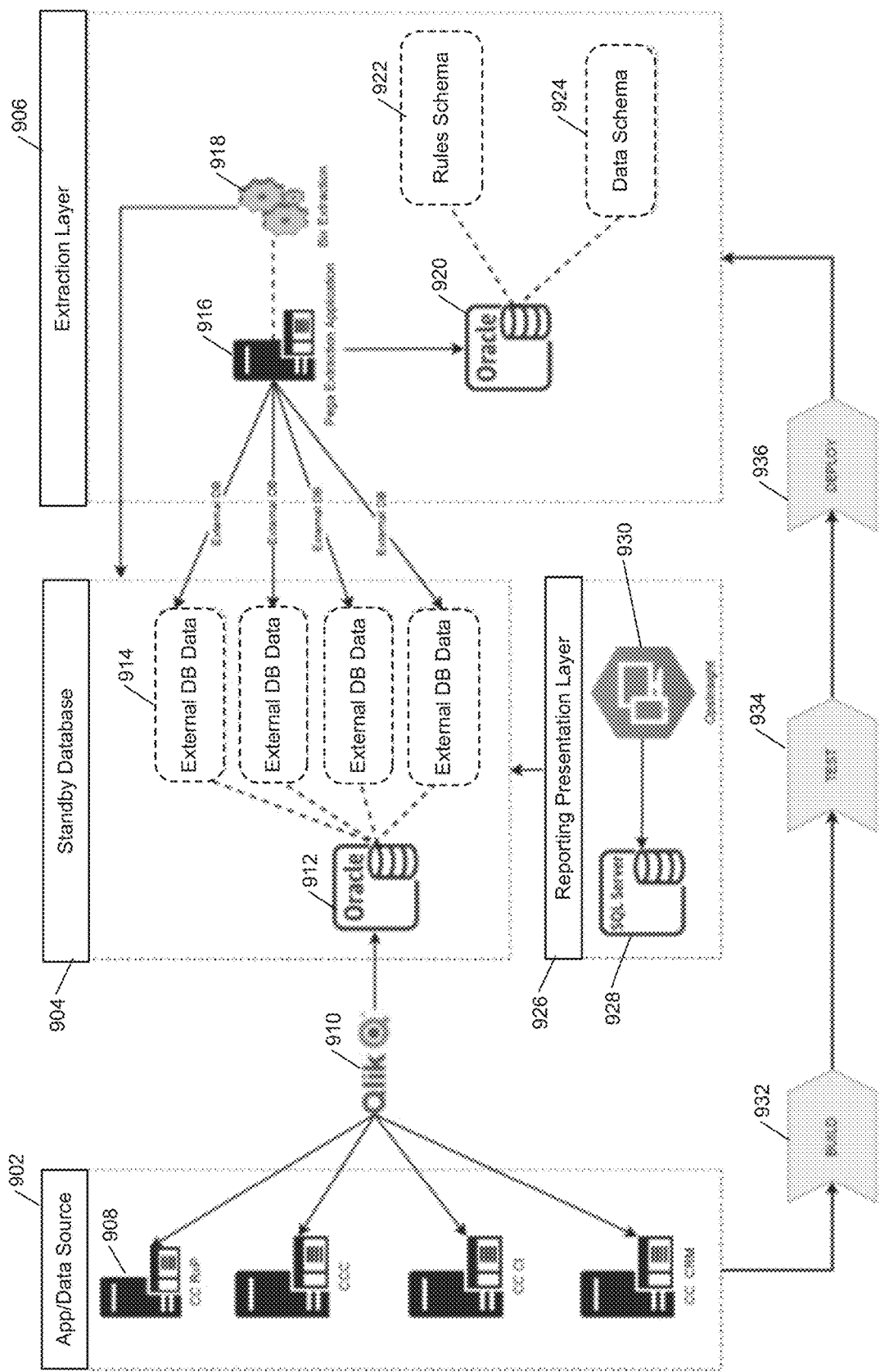
FIG. 9 is a functional block diagram illustrating example interactions between an application and data source, a standby database, an extraction layer and a reporting presentation layer.

FIG. 9 is a functional block diagram illustrating example interactions between an application and data source 902, a standby database 904, an extraction layer 906 and a reporting presentation layer 926. As shown in FIG. 9, the data source 902 includes multiple applications 908, which may have different corresponding data sources.

The standby database 904 includes a database 912 (e.g., an Oracle database), which may store multiples versions of external database data 914. Each of the external database data 914 may correspond to a different one of the applications 908, and may be updated based on a replication process 910 between the standby database 904 and the data source 902.

The extraction layer 906 may include an extraction application 916, a BIX extraction 918, and an extraction layer database 920. The extraction layer database 920 may include a rules schema 922 and a data schema 924. The reporting presentation layer 926 may include an SQL server 928, and a portal 930, such as OpsInsight. The reporting presentation layer 926 may be coupled with the standby database 904 to obtain data for reporting. In various implementations, multiple steps such as build 932, test 934 and deploy 936 may be executed between the data source 902, the standby database 904 and the extraction layer 906.

In various implementations, the layer of FIG. 9 may be integrated to support an end-to-end product. For example, a reporting database (e.g., standby database) may be set up, and data replication (e.g., change data capture) may be used to replicate data from the application database (e.g., the data sources 902) to the standby database 904.

The data extraction layer 906 (e.g., data extraction engine) may be built using Pega BIX, to keep running in close to real-time, and extract encrypted data out of a BLOB. The extraction engine may use the standby database as an external database to run the extraction process.

Data from multiple applications may be hosted under different and unique schemas dedicated for each corresponding application. Extracted and encrypted data may be reloaded to the same standby database. Any other desired processes may use the close to real-time extracted data for analytics, reporting, etc. Real-time may refer to extracting data instantly, within seconds, within minutes, within hours, etc., of data being uploaded to a database, a change data capture occurring, etc., as opposed to requiring overnight updates, or updates over the period of days or weeks, etc.

The data extraction engine may be an enterprise wide application, configured to support any application (e.g., any Pega application). Applications interested in using the data extraction engine of the extraction layer 906 may be onboarded by taking property, classes and rule sets from the application, and migrating them to the extraction engine. Extraction rules may be developed in the extraction engine, and necessary classes may be connected to the standby database tables including the BLOB (or other suitable data objects having data which needs extraction). A BIX extract execution may be set up close to real-time, and access restriction may be implemented.

Database Replication and Real-Time Data Extraction Processes

Figure 10:
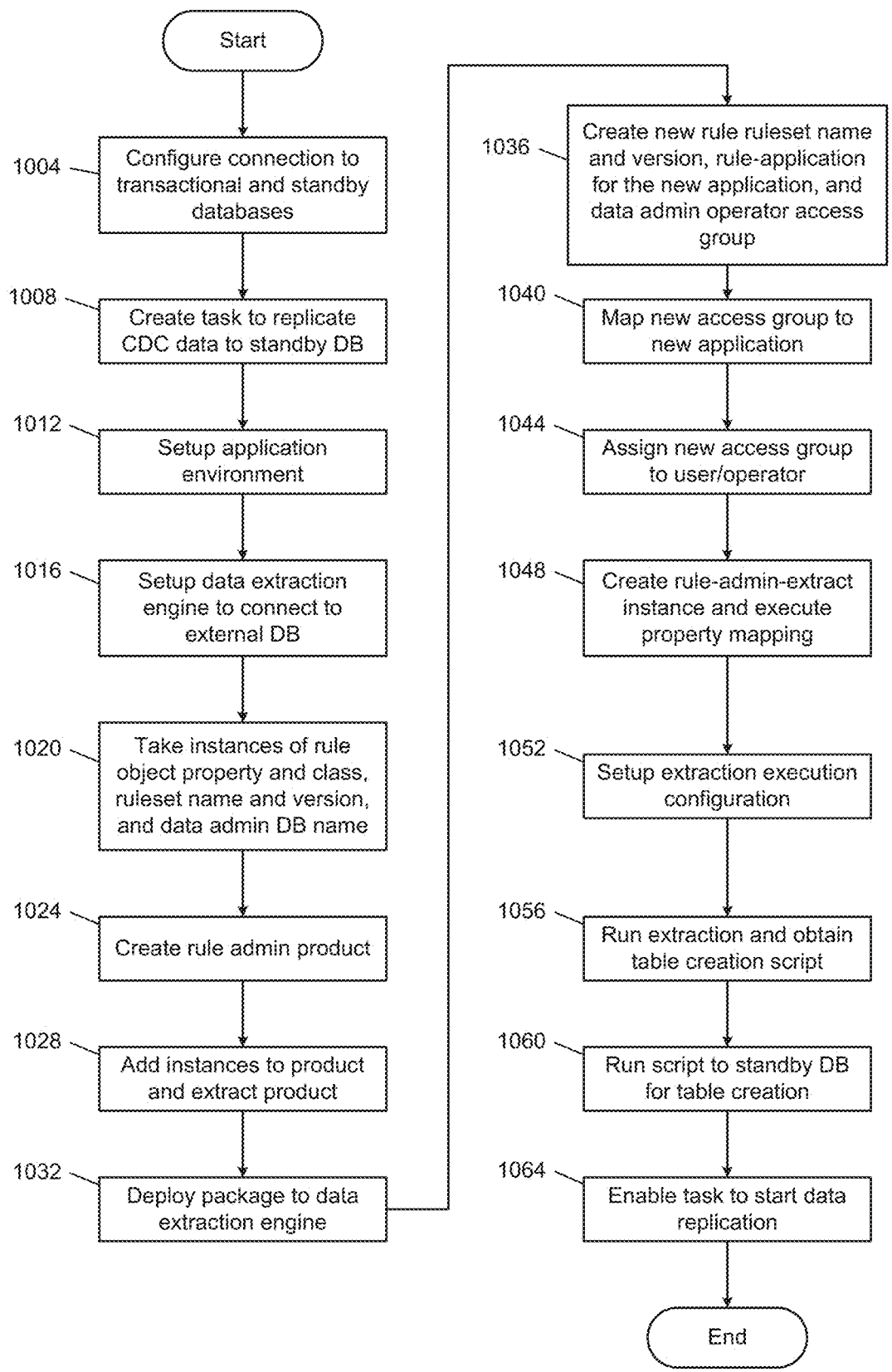
FIG. 10 is a flowchart depicting an example process for database replication for real-time data extraction.

FIG. 10 is a flowchart depicting an example process for database replication for real-time data extraction. In various implementations, the process of FIG. 10 may be executed by the system controller 408, such as the application/data source module 408, the replication process module 428, and/or the data extraction layer 430.

At 1004, the process begins by configuring a connection to the transactional and standby databases. Control then creates a task to replicate changed data capture (CDC) to the standby database, at 1008 (e.g., such as a Qlik task).

At 1012, control sets up an application environment, and control sets up a data extraction engine (DEE) to connect to the external database (e.g., the standby database) at 1016. At 1020, control takes instances of rule object properties and classes, rule set names, and version, and data admin database name values, and then creates a rule admin product at 1024.

Control proceeds to add instances to the product, and extract the product, at 1028. At 1032, control deploys a package to a data extraction engine. Control then creates a new rule ruleset name and version at 1036, and also creates a rule-application for the new application, and a data admin operator access group.

At 1040, control maps an access group to the new application. Control then assigns a new access group to the user/operation at 1044. At 1048, control creates a rule-admin-extract instance, and execute property mapping. At 1052, control sets up an extraction engine configuration.

At 1056, control is configured to run a data extraction, and obtain a table creation script. At 1060, control runs the script to the standby database for table creation. Control then enables the task to start data replication at 1064.

The above steps are provided for example only, and other example process may include more or less (or other) steps. In some examples, the steps may be separated in to general processes of infrastructure setup, product-application creation, deploying a product to the data extraction engine, setting up the extraction application to the data extraction engine, and running a Qlik task execution.

Figure 11:
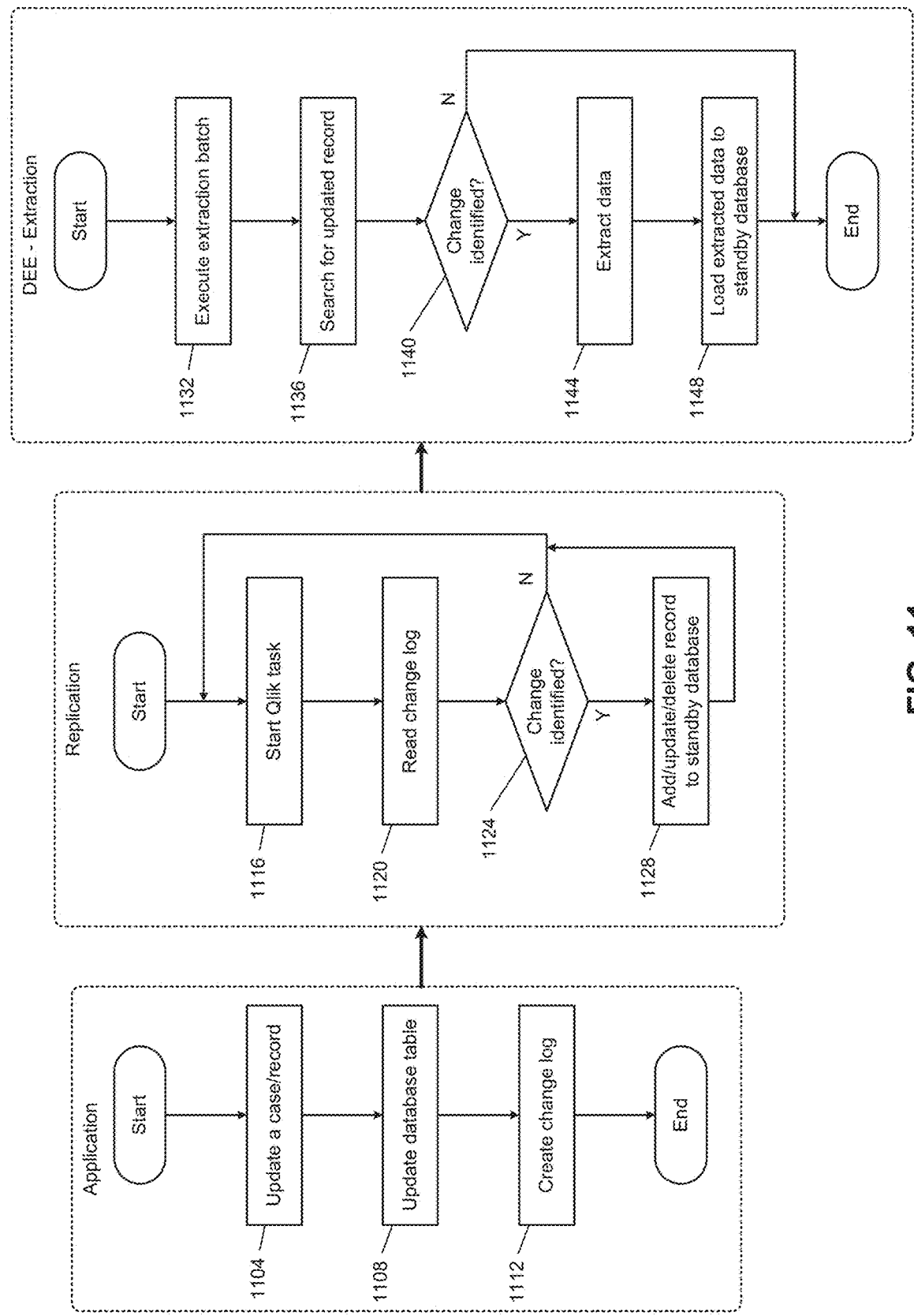
FIG. 11 is a flowchart depicting example processes implemented by an application, a replication process and a data extraction engine.

FIG. 11 is a flowchart depicting example processes implemented by an application, a replication process and a data extraction engine. In various implementations, the process of FIG. 10 may be executed by the system controller 408, such as the application/data source module 408, the replication process module 428, and/or the data extraction layer 430.

At 1104, the process begins with an application updating a case/record. The application updates a database table at 1108 (e.g., based on the updated case/record), and creates a change log at 1112.

A replication process starts a replication task at 1116, such as a Qlik task. The replication process reads the change log at 1120, and determines whether a change has been identified at 1124. If a change has not been identified at 1124, control returns to 1116. If a change has been identified at 1124, control adds/updates/delete a record in the standby database.

At 1132, the data extraction engine executes an extraction batch. The data extraction engine searches for an updated record at 1136. At 1140, the data extraction engine determines whether a change has been identified. If not, the process ends. If a change has been identified at 1140, control extracts data at 1144, and loads the extracted data to a standby database at 1148. In various implementations, the example processes may be implemented by any suitable database applications, such as Pega and a BIX framework, Qlik for change data capture, Oracle/Postgres for data replication as the standby database, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
a transactional database configured to store multiple data sources each corresponding to one of multiple applications associated with the transactional database;
a standby database configured to store multiple rule schemas and multiple data schemas, each of the multiple rule schemas and the multiple data schemas corresponding to one of the multiple data sources stored in the transactional database, wherein each of the multiple data schemas of the standby database includes one or more tables; and
processor hardware configured to execute instructions to,
monitor for a change to stored data in one of the multiple data sources, via a change data capture process,
replicate data from the transactional database to the standby database in response to an update indicated by the change data capture process,
identify encrypted data in at least one data object of an updated data table of one of the data schemas of the standby database,
extract, by a data extraction engine, data from the at least one data object to store decrypted data, wherein the standby database is an external database for the data extraction engine,
reload the decrypted data to one of the data schemas of the standby database,
select one of the one or more tables of the standby database,
identify a maximum size of a row of the selected one of the one or more tables,
determine a size of an expanded row of the selected one of the one or more tables, after extracting data from a record of the selected one of the one or more tables, and
identify a maximum daily volume of the selected one of the one or more tables,
wherein extracting data from the at least one data object includes executing multiple batch jobs to run extraction rules with an optimized frequency based on data volume incoming to the standby database.

2. The computer system of claim 1, wherein the at least one data object of the updated data table of one of the data schemas of the standby database is a binary large object (BLOB).

3. The computer system of claim 1, wherein:
the data sources include a first data source corresponding to a first one of the multiple applications and a second data source corresponding to a second one of the multiple applications;
the multiple rule schemas include a first rule schema corresponding to the first data source associated with the first one of the multiple applications and a second rule schema corresponding to the second data source associated with the second one of the multiple applications; and
the multiple data schemas include a first data schema corresponding to the first data source associated with the first one of the multiple applications and a second data schema corresponding to the second data source associated with the second one of the multiple applications.

4. The computer system of claim 1, wherein the processor hardware is configured to execute instructions to extract data from the at least one data object, and reload the decrypted data to one of the data schemas of the standby database, in real time in response to the update indicated by the change data capture process.

5. The computer system of claim 1, wherein the processor hardware is configured to execute instructions reload the decrypted data to a same one of the data schemas of the standby database which stores the at least one data object.

6. The computer system of claim 1, wherein the transactional database includes a relational database management system (RDBMS).

7. The computer system of claim 1, wherein
the standby database includes at least one identifier configured to facilitate a read of a record from the one or more tables, a write of the record to the one or more tables, an update of the record from the one or more tables, and a deletion of the record from the one or more tables.

8. The computer system of claim 7, wherein the one or more tables include at least one of a customer name record, a customer date of birth record, a customer age record, and a customer email record.

9. The computer system of claim 7, wherein the processor hardware is configured to execute instructions to:
determine a specified number of years for storing data of the selected one of the one or more tables; and
calculate a storage size based on the size of the expanded row, the maximum daily volume and the specified number of years.

10. The computer system of claim 1, wherein:
the multiple applications are Pega applications;
replicating data includes executing a Qlik tool replication process; and
the data extraction engine includes a Pega BIX extraction module.

11. A method of database replication for real-time data extraction, the method comprising:
monitoring for a change to stored data in one of multiple data sources stored in a transactional database, via a change data capture process, the multiple data sources each corresponding to one of multiple applications associated with the transactional database;
replicating data from the transactional database to a standby database in response to an update indicated by the change data capture process, wherein the standby database is configured to store multiple rule schemas and multiple data schemas, each of the multiple rule schemas and the multiple data schemas corresponding to one of the multiple data sources stored in the transactional database, and wherein each of the multiple data schemas of the standby database includes one or more tables;
identifying encrypted data in at least one data object of an updated data table of one of the data schemas of the standby database;
extracting, by a data extraction engine, data from the at least one data object to store decrypted data, wherein the standby database is an external database for the data extraction engine;
reloading the decrypted data to one of the data schemas of the standby database,
selecting one of the one or more tables of the standby database;
identifying a maximum size of a row of the selected one of the one or more tables;

determining a size of an expanded row of the selected one of the one or more tables, after extracting data from a record of the selected one of the one or more tables; and identifying a maximum daily volume of the selected one of the one or more tables, wherein extracting data from the at least one data object includes executing multiple batch jobs to run extraction rules with an optimized frequency based on data volume incoming to the standby database.

12. The method of claim 11, wherein the at least one data object of the updated data table of one of the data schemas of the standby database is a binary large object (BLOB).

13. The method of claim 11, wherein:

the data sources include a first data source corresponding to a first one of the multiple applications and a second data source corresponding to a second one of the multiple applications;

the multiple rule schemas include a first rule schema corresponding to the first data source associated with the first one of the multiple applications and a second rule schema corresponding to the second data source associated with the second one of the multiple applications; and the multiple data schemas include a first data schema corresponding to the first data source associated with the first one of the multiple applications and a second data schema corresponding to the second data source associated with the second one of the multiple applications.

14. The method of claim 11, wherein the extracting and reloading includes extracting data from the at least one data object, and reloading the decrypted data to one of the data schemas of the standby database, in real time in response to the update indicated by the change data capture process.

15. The method of claim 11, wherein reloading includes reloading the decrypted data to a same one of the data schemas of the standby database which stores the at least one data object.

16. The method of claim 11, wherein the transactional database includes a relational database management system (RDBMS).

17. The method of claim 11, wherein the standby database includes at least one identifier configured to facilitate a read of a record from the one or more tables, a write of the record to the one or more tables, an update of the record from the one or more tables, and a deletion of the record from the one or more tables.

18. The method of claim 17, wherein the one or more tables include at least one of a customer name record, a customer date of birth record, a customer age record, and a customer email record.

19. The method of claim 17, further comprising:

determining a specified number of years for storing data of the selected one of the one or more tables; and calculating a storage size based on the size of the expanded row, the maximum daily volume and the specified number of years.

20. The method of claim 11, wherein:

the multiple applications are Pega applications;

replicating data includes executing a Qlik tool replication process; and the data extraction engine includes a Pega BIX extraction module.

* * * * *